(12) United States Patent
Burkell et al.

(10) Patent No.: US 11,909,019 B2
(45) Date of Patent: Feb. 20, 2024

(54) BATTERY MANAGEMENT SYSTEM

(71) Applicant: Transportation IP Holdings, LLC, Norwalk, CT (US)

(72) Inventors: Neil Burkell, Erie, PA (US); Ajith Kuttannair Kumar, Erie, PA (US); Jacob Pressman, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 39 days.

(21) Appl. No.: 17/513,181

(22) Filed: Oct. 28, 2021

(65) Prior Publication Data

US 2022/0271363 A1    Aug. 25, 2022

Related U.S. Application Data

(60) Provisional application No. 63/151,352, filed on Feb. 19, 2021.

(51) Int. Cl.
| | |
|---|---|
| *H01M 10/635* | (2014.01) |
| *H01M 10/613* | (2014.01) |
| *H01M 10/615* | (2014.01) |
| *H01M 10/625* | (2014.01) |
| *H01M 10/6567* | (2014.01) |
| *H01M 10/663* | (2014.01) |
| *H01M 10/48* | (2006.01) |

(52) U.S. Cl.
CPC ....... *H01M 10/635* (2015.04); *H01M 10/486* (2013.01); *H01M 10/613* (2015.04); *H01M 10/615* (2015.04); *H01M 10/625* (2015.04); *H01M 10/6567* (2015.04); *H01M 10/663* (2015.04); *H01M 2220/20* (2013.01)

(58) Field of Classification Search
CPC ............. H01M 10/635; H01M 10/613; H01M 10/615; H01M 10/625; H01M 10/6567; H01M 10/663; H01M 10/486
See application file for complete search history.

(56) References Cited

U.S. PATENT DOCUMENTS

| | | |
|---|---|---|
| 7,231,877 B2 | 6/2007 | Kumar |
| 7,444,944 B2 | 11/2008 | Kumar et al. |
| 7,532,960 B2 | 5/2009 | Kumar |
| 7,571,683 B2 | 8/2009 | Kumar |
| 7,669,534 B2 | 3/2010 | Kumar et al. |
| 8,903,573 B2 | 12/2014 | Chandra et al. |
| 9,156,477 B2 | 10/2015 | Cooper et al. |
| 9,815,470 B2 | 11/2017 | Luther et al. |

(Continued)

FOREIGN PATENT DOCUMENTS

| | | |
|---|---|---|
| JP | 201275282 A | 4/2012 |
| WO | 2010028692 A1 | 3/2010 |

OTHER PUBLICATIONS

First Examination Report dated Jan. 11, 2023 for corresponding Indian Application No. 202214005694 (8 pages).

(Continued)

*Primary Examiner* — Karie O'Neill Apicella
(74) *Attorney, Agent, or Firm* — The Small Patent Law Group LLC; Christopher R. Carroll

(57) ABSTRACT

A battery management system thermally conditions a battery assembly prior to a determined upcoming time or the battery assembly's arrival at an upcoming location, and selects a source of the power used for the thermal conditioning.

20 Claims, 5 Drawing Sheets

(56) References Cited

U.S. PATENT DOCUMENTS

| | | |
|---|---|---|
| 9,950,722 B2 | 4/2018 | Kumar et al. |
| 2008/0288132 A1 | 11/2008 | King et al. |
| 2014/0039735 A1 | 2/2014 | Major et al. |
| 2014/0316630 A1* | 10/2014 | Kohlberger ............ B60L 53/11 |
| | | 701/22 |
| 2015/0100188 A1 | 4/2015 | Wagner et al. |
| 2016/0315363 A1 | 10/2016 | Esteghlal |
| 2019/0217721 A1* | 7/2019 | Marcicki ............ H01M 10/613 |
| 2020/0055406 A1 | 2/2020 | Vallender et al. |
| 2020/0317087 A1 | 10/2020 | Brinkmann et al. |
| 2020/0319259 A1 | 10/2020 | Pressman et al. |

OTHER PUBLICATIONS

Extended European Search Report for corresponding Patent Application No. 22 156 500.5 dated Jul. 14, 2022 (12 pages).
Office Action dated Sep. 13, 2023 for corresponding JP Application No. 2022-020611 (7 pages).

* cited by examiner

BATTERY MANAGEMENT SYSTEM

CROSS-REFERENCE TO RELATED APPLICATIONS

This application claims priority to U.S. Provisional Application No. 63/151,352 (filed 19 Feb. 2021), the entire disclosure of which is incorporated herein by reference.

BACKGROUND

Technical Field

The subject matter described herein relates to systems that control operation of energy storage devices, such as batteries.

Discussion of Art

Various powered systems can be powered by electric current received from energy storage devices. For example, vehicles can be powered to move along routes, to power auxiliary loads, etc., by batteries onboard the vehicles. The energy storage devices wear over time and the amount of energy that the devices can store may decrease over time. For example, batteries that are charged and discharged more often, batteries having increased duty cycles (e.g., are used more often to power loads), batteries exposed to extreme temperatures (e.g., elevated or cool temperatures), etc., can have shorter useful lives and/or can store less energy than other batteries that are charged or discharged less often, batteries having decreased duty cycles, batteries that are not exposed to extreme temperatures, or the like.

Several factors may contribute to accelerated aging of batteries, such as storage temperature, operating temperature, higher C-rates (e.g., discharge rates of the batteries), larger duty cycle counts, and the like. Some powered systems, such as vehicles, may use batteries as a primary source of power for such things as tractive effort, auxiliary equipment, and managing the batteries themselves. Batteries can heat up during charging and discharging and can see temperature fluctuations based on environmental conditions. Accordingly, the systems may use battery energy for thermal management of the batteries (e.g., to cool hotter batteries and heat up cooler batteries). It may be desirable to have systems and methods that differ from those that are currently available.

BRIEF DESCRIPTION

In one example, a method includes thermally conditioning a battery assembly prior to a determined upcoming time or the battery assembly's arrival at an upcoming location, and selecting a source of the power used for the thermal conditioning.

In one example, a system includes a controller having one or more processors that may thermally condition a temperature of a battery assembly. The controller also may select a source of the power used to condition the battery assembly temperature, a time for the thermal conditioning to occur, or both the source of the power and the time for the thermal conditioning.

In one example, a method includes determining a predicted ambient temperature at one or more of (a) an upcoming time and/or (b) an upcoming location that a vehicle is to travel to or through. The vehicle has one or more loads that are at least partially powered by a battery assembly onboard the vehicle. The method also includes determining a duty cycle of the battery assembly for the vehicle at the one or more of the upcoming time or the upcoming location, and determining a temperature pre-conditioning plan for the battery assembly based on the predicted ambient temperature and based on the duty cycle of the battery assembly. The temperature pre-conditioning plan includes one or more of conditioning times during which the battery assembly is heated or cooled ahead of the one or more of the upcoming time or the upcoming location, conditioning locations where the battery assembly is heated or cooled ahead of the one or more upcoming locations, an amount of electric energy stored in the battery assembly that is used to heat or cool the battery assembly and not available for powering the one or more loads, a first availability of an off-board charging source for charging the battery assembly, and/or a second availability of an onboard source to provide power to charge the battery assembly.

In one example, a system includes one or more processors may determine a predicted ambient temperature at one or more upcoming locations that a vehicle is to travel to or through. The vehicle has a propulsion system that is at least partially powered by a battery assembly onboard the vehicle. The one or more processors also may determine a duty cycle of the battery assembly for upcoming travel of the vehicle to or through the one or more upcoming locations, and may determine a temperature pre-conditioning plan for the battery assembly based on the predicted ambient temperature and based on the duty cycle of the battery assembly. The temperature pre-conditioning plan includes one or more of (a) conditioning times during which the battery assembly is heated or cooled ahead of the one or more upcoming locations and/or (b) conditioning locations where the battery assembly is heated or cooled ahead of the one or more upcoming locations.

In one example, a method includes determining an upcoming predicted ambient temperature for a vehicle having a propulsion system that is at least partially powered by a battery assembly onboard the vehicle, and determining a temperature pre-conditioning plan for the battery assembly based on the predicted ambient temperature. The temperature pre-conditioning plan directs heating and/or cooling of the battery assembly to reduce excursions of a measured temperature of the battery assembly outside of a desired temperature range compared to the battery assembly not being heated or cooled.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
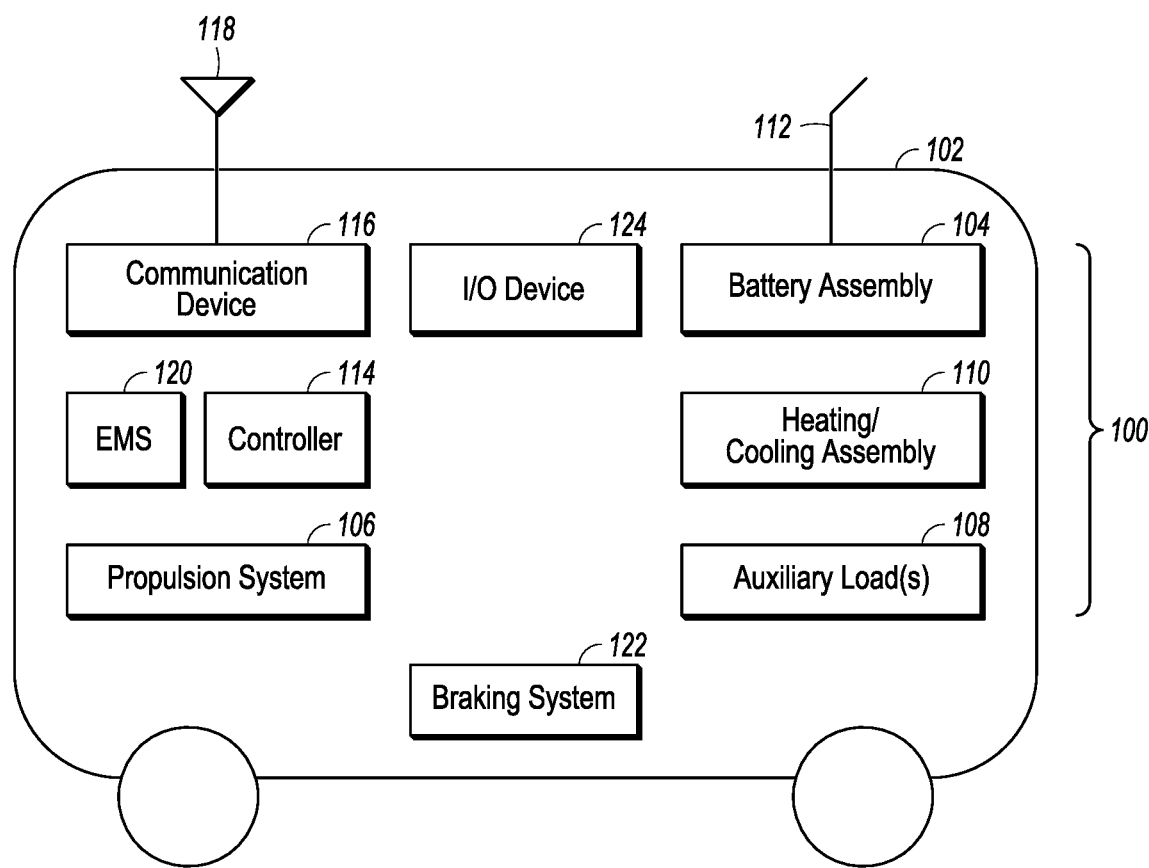
FIG. 1 illustrates one example of a battery monitoring system.

One or more embodiments of the inventive subject matter described herein includes battery management systems and methods that control a temperature of an energy storage device (e.g., batteries or battery assemblies, and these terms are used interchangeably herein). This may be done in some embodiments to increase the longevity of energy storage devices. The systems and methods described herein may calculate, predict or otherwise determine an expected temperature of a battery. This may be done with reference to an expected or a predicted ambient temperature to which the battery may be exposed during a future period. The systems and methods in some embodiments may calculate, predict, or otherwise determine a duty cycle of the battery over the course of the future period. The systems and methods can, for example, plan and implement a temperature pre-conditioning process for the battery with reference to the predicted ambient temperature and the expected duty cycle. The pre-conditioning may then reduce the amount of battery power needed to maintain the battery in the desired temperature range during that future period.

In some embodiments, the systems and methods can determine an expected behavior of ambient temperature and may share knowledge between sensors of other applications to adapt or modify the expected behavior. The expected ambient function can take into account time (e.g., time of year, such as a season; time of day; etc.), prior history of the ambient behavior in past years, and external inputs from databases (e.g., weather reporting services). In one embodiment, the battery is in a vehicle. Vehicles are mobile, and so the expected ambient temperature may be based in part on a future expected location and the predicted ambient temperature at that location at the time the vehicle is expected to be there. And, while ambient temperature is discussed here and throughout, it is expected that other ambient conditions (pressure, wind speed, humidity, etc.) may be obtained and may be used to contribute to the system's determination.

The systems and methods can determine a duty cycle of the battery based on prior knowledge of the duty cycle, sharing knowledge between other batteries and systems (e.g., an energy management system) that determine or plan trips of the vehicles to increase efficiency of the vehicles (e.g., reduce fuel consumption and/or battery usage). The systems and methods can use the ambient and duty cycle predictions to condition the battery to reduce the battery energy that is used to maintain the battery within a desired operating temperature range. Sources of electrical power for conditioning the battery include wayside charging stations, an onboard power system (e.g., a prime mover engine, an e-turbo, or an aux generator), energy transfer from other sources (catenary line, third rail, etc.), dynamic braking, and from the battery itself. In one embodiment, a source may provide thermal energy rather than electrical to supplant or supplement the conditioning process. A thermal source may be, for example, a fuel cell or an internal combustion engine's exhaust flow.

As one example, a vehicle may be parked overnight in a cool garage (where the ambient temperature is twelve degrees Celsius). The vehicle may be scheduled to depart the garage in the morning and travel through sub-zero weather (where the ambient temperature is expected to be no greater than negative eighteen degrees Celsius) to the top of a mountain within one hour. The vehicle is then scheduled to travel in the cold weather for four hours before descending to a lower elevation where the ambient temperature is expected to be thirty-eight degrees Celsius. The desired temperature range for the battery assembly may be in a range of from about twenty-one degrees Celsius to about twenty-six degrees Celsius. The pre-conditioning plan may be created based on this information so that the battery assembly is heated to twenty-nine degrees Celsius fifteen minutes prior to departure from the garage. The plan may dictate that the battery assembly is heated by powering a heating and/or cooling assembly using electric power from a utility grid so as to save stored energy in the battery assembly for later usage in powering the vehicle and/or vehicle loads. Immediately on leaving the garage, the ambient temperature drops. This pre-heating can help keep the battery assembly within the desired temperature range longer, and hopefully during travel up the mountain. On the portion of the trip where the vehicle is heading down the mountain, the plan may direct the battery assembly to be heated to twenty-five degrees Celsius using energy obtained from dynamic braking (e.g., to power the heating and/or cooling assembly). The plan can direct the last dynamic braking event (and/or other energy) to be used to cool the battery assembly (or to cool a heat sink thermally coupled with the battery assembly) to a determined temperature. A suitable example temperature may be less than twenty-one degrees Celsius. The conditioning may be done at the lower elevation before the vehicle climbs and experiences elevated temperatures.

FIG. 1 illustrates one example of a battery monitoring system 100. The monitoring system may be partially or entirely included within a powered system 102. For example, some of the components of the monitoring system may be included in the powered system and one or more of the components may be outside of the powered system. Alternatively, all of the components of the monitoring system may be included in the powered system. The powered system is a vehicle in the illustrated embodiment. For example, the powered system may be a rail vehicle (e.g., a locomotive), an automobile, a truck, a bus, an agricultural vehicle, a mining vehicle, or the like. Alternatively, the powered system may be a stationary system. The powered system includes a battery assembly 104 that includes one or more energy storage devices, such as battery cells. The battery assembly can store electric energy that is used to power one or more loads of the powered system. For example, the battery assembly can output electric potential and/or current to power a propulsion system 106 and/or one or more auxiliary loads 108.

The propulsion system can represent one or more components that are powered to propel the powered system, such as one or more motors. Optionally, the propulsion system can include an engine and/or alternator or generator that operates to separately provide electric energy to power loads of the powered system (e.g., the motors). The battery assembly and engine can both operate at different times and/or the same time to power the motors that propel the powered system. The auxiliary loads can be powered by the battery assembly and/or propulsion system to perform work that does not propel the powered system. For example, the auxiliary loads can include display devices, monitoring devices (e.g., sensors), or the like.

One example of an auxiliary load is a heating and/or cooling assembly 110 ("Heating/Cooling Assembly" in FIG. 1) that can change the temperature of the battery assembly, the interior of the powered system, or the like. The heating and/or cooling assembly can represent resistive heating elements, a heating blanket, a forced air heating system, a heating, ventilation, and air conditioning (HVAC) system, a cooling system (e.g., that uses a coolant such as air or a liquid coolant), a radiator, a Peltier device, compressed air system, or the like. The hardware component(s) forming or included in the heating and/or cooling season can be modified depending on the season. For example, a thermal or heating blanket may be placed over, around, or near the battery assembly during cooler seasons (e.g., the winter and/or early spring), while an additional fan may be added or mounted during warmer seasons (e.g., the summer and/or early fall). In an embodiment that derives energy from a liquified natural gas (LNG) system or the like, there may be re-gasifier or other system that provides heat to a cryogenic fluid, which may be useful in conjunction with embodiments described herein. Optionally, the heating and/or cooling assembly can include one or more conduits or other thermally conductive bodies (e.g., heat sinks) that transfer heat from the propulsion system (e.g., the engine) to the battery assembly to heat the battery assembly as directed by a temperature pre-conditioning plan, as described herein. The heating and/or cooling assembly can include a cooling circuit of the propulsion system that can operate to cool the battery assembly. For example, the heating and/or cooling assembly can include one or more conduits through which a coolant (e.g., water, antifreeze, or the like) is directed by the battery assembly to draw heat from the battery assembly and cool the battery assembly. Optionally, the heating and/or cooling assembly can be a thermal mass, such as a heat sink, that draws or conducts heat out of the battery assembly to cool the battery assembly. The heating and/or cooling assembly can heat or cool the battery assembly, and/or can heat or cool a heat sink that is thermally coupled with the battery assembly to heat or cool the battery assembly.

In the illustrated example, the powered system includes a collection device 112 that can conduct or otherwise receive electric current from a source that is outside of or off-board the vehicle. As one example, the collection device can be a pantograph that receives electric current from an electrified catenary. As another example, the collection device can be a conductive shoe or brush that receives current from an electrified rail. Optionally, the collection device can be a conductive coil that wirelessly receives energy through induction. In another example, the collection device can be a connector, cable, or the like, that can be plugged into the source of current (e.g., a cable that can be coupled with an outlet of a utility grid).

The powered system can include a controller 114 that represents hardware circuitry having and/or connected with one or more processors (e.g., one or more microprocessors, one or more integrated circuits, one or more field programmable gate arrays, etc.) that control operation of the monitoring system and/or the powered system as described herein. The controller can generate and send control signals to the components of the powered system and/or monitoring system to control operation of these components.

A communication device 116 represents receiving, transmitting, and/or transceiving circuitry that can communicate with one or more devices that are outside of or off-board the powered system. For example, the communication device can represent or include one or more antennas 118, modems, or the like. The communication device can be used by the controller and/or other components of the powered system and/or monitoring system to wirelessly communicate with off-board locations.

An energy management system 120 ("EMS" in FIG. 1) optionally can be included in the powered system and/or monitoring system. The energy management system can represent hardware circuitry that includes and/or is connected with one or more processors. This circuitry and/or processors may be the same as or separate from (e.g., in addition to) the circuitry and/or processors of the controller. The energy management system determines operational plans for the powered system to achieve one or more goals within designated constraints. As one example, the energy management system can determine a trip plan that dictates operational settings of the vehicle at different locations, times, distances, etc. of upcoming travel of the vehicle. These operational settings can cause the vehicle to travel within the constraints (e.g., speed limits, forces exerted on the vehicle and/or route, remaining a safe distance from other vehicles or objects, etc.) while driving the vehicle toward achievement of the goal(s) (e.g., reducing fuel consumption, battery energy consumption, emission generation, etc.) relative to the vehicle traveling within the constraints but using other settings. The operational settings can be throttle settings, brake settings, speeds, or the like.

The powered system optionally can include a braking system 122. The braking system can represent friction brakes, air brakes, dynamic brakes (e.g., one or more of the traction motors of the propulsion system that also can generate braking effort via dynamic braking), or the like. The powered system optionally can include an input and/or output device 124 ("I/O Device" in FIG. 1) that can receive input from an operator and/or present information to the operator. The input and/or output device can represent an electronic display, touchscreen, keyboard, microphone, speaker, or the like.

Figure 2:
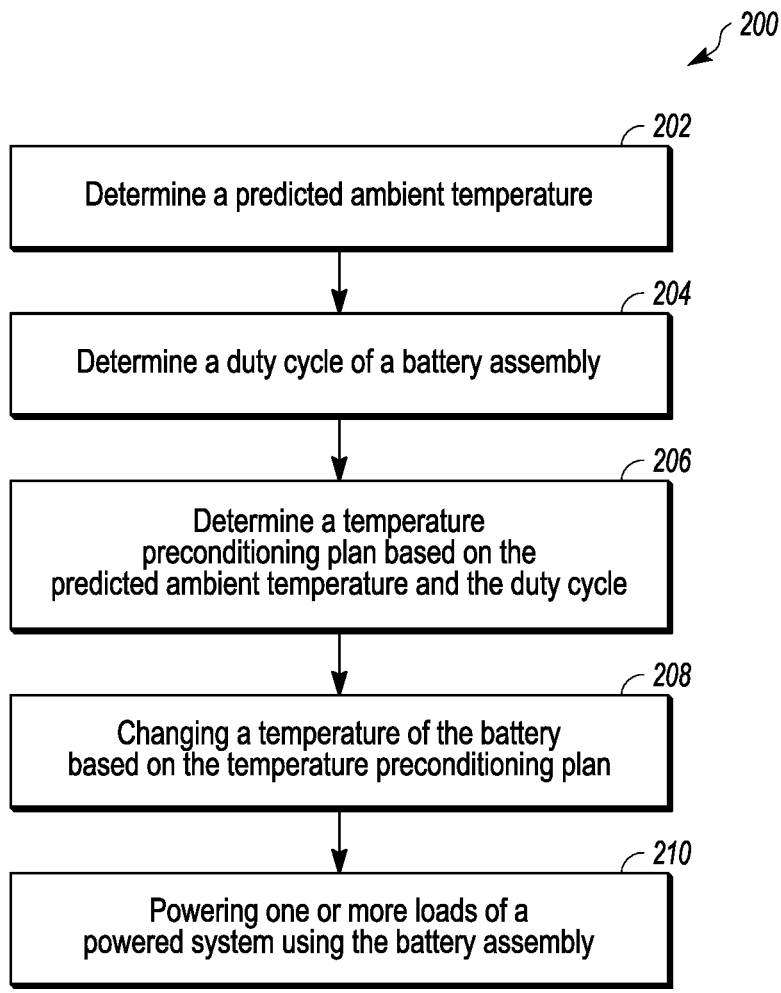
FIG. 2 illustrates a flowchart of one example of a method for monitoring and/or controlling temperature conditioning of a battery assembly.

FIG. 2 illustrates a flowchart of one example of a method 200 for monitoring and/or controlling temperature conditioning of a battery assembly. The method can represent operations that are performed by the monitoring system (e.g., by the controller) to pre-condition temperatures of the battery assembly to improve operation of the battery assembly and/or extend the useful life of the battery assembly relative to operating the powered system without pre-conditioning temperatures of the battery assembly.

At step 202, a predicted ambient temperature at an upcoming time and/or upcoming location is determined. The predicted ambient temperature can be a temperature at a future time and/or location that the powered system has not yet reached, but is planning to reach. For example, the predicted ambient temperature can be the expected temperature where the powered system is scheduled to travel to, where the powered system is currently located, where the powered system is moving toward, or the like. The predicted ambient temperature can be a forecasted temperature, a temperature determined from one or more prior temperature measurements at the upcoming location, or the like. The predicted ambient temperature can be obtained from a weather service, such as the National Weather Service. The predicted ambient temperature at an upcoming location or time may include a single predicted temperature, or may include a range of predicted ambient temperatures. For example, a predicted ambient temperature for an upcoming location and time may be twenty-two degrees Celsius or may be a range of temperatures including twenty to twenty-four degrees Celsius.

The predicted ambient temperature can be based on a season of a calendar year during which the powered system will be at the upcoming location(s). For example, if a vehicle is traveling toward a location in the summer, the predicted ambient temperature likely will be warmer than if the vehicle is traveling toward the same location during the winter. The predicted ambient temperature can be based on a geographic location of the upcoming location. For example, if the powered system is at a location that is near a large body or water or is surrounded by a body of water, the predicted ambient temperature may be more moderate than if the powered system is farther from a body of water.

The predicted ambient temperature can be based on a prior temperature profile of one or more prior dates. For example, the predicted ambient temperature can be an average or median temperature calculated from multiple prior measurements of temperature at the location (within the same season, month, etc.). Optionally, the predicted ambient temperature can be based on an altitude of the upcoming location(s). For example, locations with higher altitudes may be predicted to have lower temperatures than locations with lower altitudes. The predicted ambient temperature can be based on whether the upcoming locations are within an urban area or a rural area. An upcoming location within an urban area may be determined to be warmer than if the location were in a rural area. The predicted ambient temperature can be based on whether the upcoming location is in an airflow restricted area. An airflow restricted area may be a location or set of locations that are at least partially enclosed. For example, tunnels, valleys, buildings, etc. may be airflow restricted areas.

The ambient temperature may be predicted in that the temperature has not yet been measured, but is calculated or otherwise determined. The predicted ambient temperature can be determined based on one or more prior travels of the vehicle or another vehicle to or through the one or more upcoming locations or nearby locations that are within a threshold distance of planned travel of the vehicle.

In some situations the predicted ambient temperature can be based on one or more measured temperatures. Sensors can be disposed in various locations and can measure ambient temperatures in those areas. These sensors can report the measured temperatures to the controller, which can determine the ambient temperature when the powered system arrives at an upcoming location based on the measured temperature.

Figure 3:
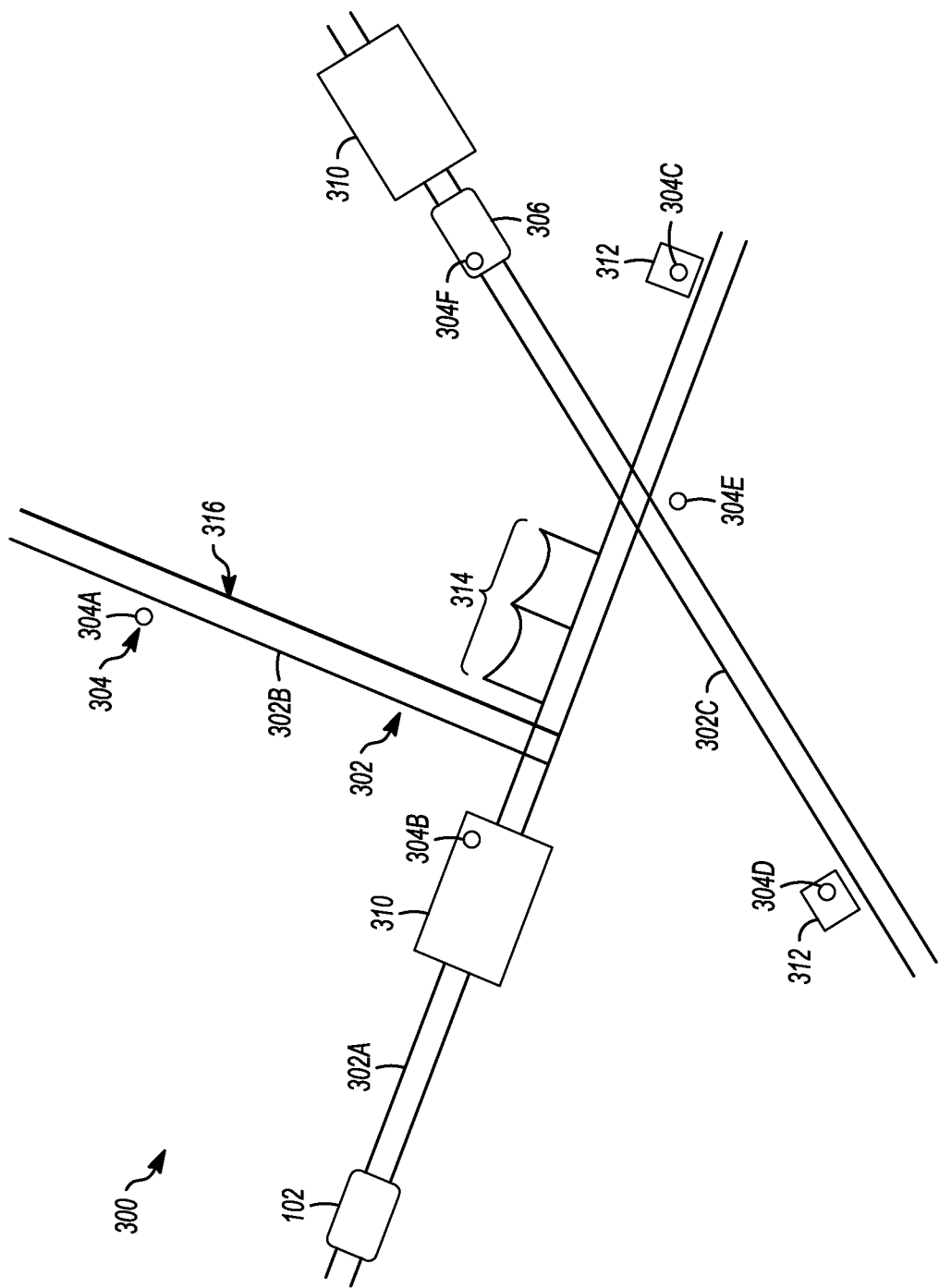
FIG. 3 illustrates one example of a transportation network.

FIG. 3 illustrates one example of a transportation network 300. The transportation network can include several interconnected routes 302 (e.g., routes 302A-C), such as tracks, roads, paths, or the like. The powered system can travel within and/or through the transportation network on the routes. As described above, several temperature sensors 304 (e.g., sensors 304A-F) can be disposed in different locations in the transportation network. Some of these sensors 304A-E can be wayside sensors in that the sensors are stationary. One or more other vehicles 306 optionally can include a temperature sensor 304F. This type of temperature sensor can be a mobile sensor in that the sensor moves with the vehicles. The wayside and/or mobile sensors can communicate the measured ambient temperatures to the controller (directly or indirectly via one or more other devices and/or systems, such as beacon, a wireless repeater, a building or facility 310, a charging station 312, or the like). For example, the temperature sensors can include or be connected with another communication device to communicate the measured ambient temperatures. The building or facility can represent dispatches, rail yards, parking garages or lots, another type of garage, repair stations, weather stations (e.g., an observation post where weather conditions are observed), etc.

The controller can receive the measured temperatures from one or more sensors at or near where the powered system will be located and can predict an upcoming temperature of that location. For example, if the powered system is heading toward or is scheduled to travel by the sensor 304C, the controller can examine the temperature measured by the sensor 304C. The controller can determine how long it will be before the powered system reaches a location 312 at or near the sensor 304C, the time of year when the vehicle will reach the location, the time of day when the vehicle will reach the location, the altitude of the location, whether the location is in an airflow restricted area, whether the location is in an urban or rural environment, or the like. The controller can determine the predicted ambient temperature based on one or more of these factors. For example, if the ambient temperature measured by the sensor 304C is measured early in the morning, but the powered system will not reach the location until the afternoon, the controller can increase the measured ambient temperature to determine a predicted ambient temperature. As another example, if the ambient temperature measured by the sensor 304C is measured during clear weather, but the powered system will not reach the location until a time when there is likely to be snow or rain at the location, the controller can decrease the measured ambient temperature to determine a predicted ambient temperature.

Returning to the description of the method shown in FIG. 2, at step 204, a duty cycle of the battery assembly for the powered system is determined. This duty cycle can represent times during which the battery assembly is discharging energy as potential or current to one or more loads. For example, the duty cycle can indicate the times and/or locations of the powered system during which the battery assembly is discharging energy, the times and/or locations of the powered system during which the battery assembly is not discharging energy, and/or the times and/or locations of the powered system during which the battery assembly is charging. The duty cycle can dictate that the battery assembly discharge energy for the first thirty minutes, then not discharge energy for the next hour, then discharge energy for the next forty-five minutes, then charge with energy from a charging station for the next ninety minutes, or the like. The duty cycle can be determined for movement of the powered system (e.g., as the vehicle), for a time period that the powered system is stationary (e.g., as the vehicle), and/or for operation of a stationary powered system.

The controller can determine the duty cycle to achieve one or more goals subject to one or more constraints on operation of the battery assembly and/or the powered system. The controller can determine the duty cycle based on the state of charge of the battery assembly, one or more upcoming opportunities for charging the battery assembly, and/or one or more upcoming needs for discharging stored energy from the battery assembly. For example, the upcoming opportunities for charging the battery assembly can include upcoming time periods where the powered system is scheduled or planned to be in a position or state to generate or obtain electric energy to charge the battery assembly. These opportunities can include times and/or locations where the powered system is at a charging station (e.g., wireless or wired charging station) in the transportation network, is traveling along an electrified catenary 314 (shown in FIG. 3) where energy can be obtained by the collection device to charge the battery assembly, is traveling along a section of the route having an electrified rail 316 (shown in FIG. 3), where the propulsion system can generate electric current (excess current over the current needed to power the loads of the powered system) for charging the battery assembly, where the braking system can generate electric current (e.g., via dynamic braking) for charging the battery assembly, or the like. The upcoming needs for discharging stored energy from the battery assembly can include upcoming times periods and/or locations where energy is needed from the battery assembly for powering the propulsion system to propel the powered system, where energy is needed from the battery assembly for powering the heating and/or cooling assembly to heat or cool the battery assembly, and/or where energy is needed from the battery assembly to power one or more other loads of the powered system.

At step 206, a temperature pre-conditioning plan for the battery assembly is determined. The temperature pre-conditioning plan can include upcoming times and/or locations of the powered system where the battery assembly is heated or cooled (e.g., by the heating and/or cooling assembly). This plan can heat and/or cool the battery assembly so that the battery assembly remains within a designated temperature range. Optionally, the plan can heat and/or cool the battery assembly to reduce excursions of temperatures of the battery assembly outside of the designated temperature range.

The pre-conditioning plan can include conditioning times and/or conditioning locations during which the battery assembly is heated or cooled ahead of the one or more of the upcoming time(s) or the upcoming location(s) of the predicted ambient temperatures. The temperature pre-conditioning plan can be determined by the controller to maintain a temperature of the battery assembly within a desired temperature range during travel to or through the one or more upcoming locations and/or during operation of the powered system during the upcoming times (e.g., when the powered system is stationary).

The pre-conditioning plan may be created and/or modified based on the duty cycle of the battery assembly. For example, if the duty cycle of the battery assembly is decreasing, then the pre-conditioning plan may direct the controller to control the heating and/or cooling assembly to pre-heat the battery assembly prior to the duty cycle reducing. The duty cycle can be pre-planned or scheduled, and the pre-conditioning plan may include a time period where the heating and/or cooling assembly heats the battery assembly prior to the reduction in the duty cycle (with the heating terminating at the start of the duty cycle reduction or after the start of the reduction). As another example, the duty cycle may not be pre-planned or scheduled, but the controller can modify the plan to include heating the battery assembly responsive to the duty cycle of the battery assembly decreasing. The duty cycle of the battery assembly can decrease when the battery is discharging energy less frequently or less often.

The conditioning times and/or locations of the plan can result in a continuous temperature profile of the battery assembly. The continuous profile can include continual changes in the temperatures of the battery assembly. Alternatively, the profile may not be continuous, but may include one or more abrupt changes in temperature and/or dwells in temperature.

The pre-conditioning plan can dictate the source of energy for heating or cooling the battery assembly. For example, the plan can direct that the propulsion system generate electric current for powering the heating and/or cooling assembly to heat or cool the battery assembly during a first time and/or at a first location of the plan, direct the battery assembly to heat or cool the battery assembly during a second time and/or at a second location of the plan, direct another load (e.g., an electric heating blanket) to heat the battery assembly during a third time and/or at a third location of the plan, direct a wayside charging device to power the heating and/or cooling assembly to heat or cool the battery assembly at a fourth time and/or location of the plan, direct the heating and/or cooling assembly be powered by a catenary or electrified rail during at a fifth time and/or location, and so on.

The controller can create or modify the pre-conditioning plan to direct which of the different sources of energy are used to power the heating and/or cooling assembly. In this manner it may be possible to heat or cool the battery assembly at different times and/or locations based on several factors. These factors may include, for example, availability, system impact, weights and/or costs associated with the different sources of energy. For example, the battery assembly usage may be given a lower weighting than the propulsion assembly during times and/or segments of the upcoming trip of the vehicle where recharging stations are not available or less available. During other times and/or segments of the upcoming trip, the battery assembly may be given a greater weight than the propulsion assembly (e.g., during segments where there may be less fuel onboard the vehicle or less available). That is, in regions where off-board power or regenerative braking power is abundant the controller may draw more power from the battery assembly, while in areas where recharging opportunities are scarce the controller may employ a more cautious expenditure of the battery assembly reserve and offset that by running a fuel engine to provide the propulsive force.

As another example, the controller may draw power from the battery assembly because that power comes at a lower cost than power drawn from the propulsion assembly. This may occur during times and/or segments of the trip where it is less expensive to recharge the battery assembly than to use a fuel engine of the propulsion system. In other embodiments, the controller selectively chooses the battery assembly over the propulsions system from which to draw power based on other factors. These other factors may include situations where there are available recharging stations, catenaries, and/or electrified rails available for recharging the battery assembly, and/or dynamic braking is available for providing energy (e.g., during downhill segments of a trip).

The controller can select which source is used for powering the thermal management system, referred to as the heating and/or cooling assembly. The thermal management system may heat or cool the battery assembly drawing power from a source that is based at least in part on various factors. In one embodiment, the controller selects the source having the lower cost and/or greater weight to ensure that the pre-conditioning plan directs the more efficient source to power the heating and/or cooling assembly for heating or cooling the battery assembly throughout the trip or duration of operation of the powered system.

In one embodiment, the temperature pre-conditioning plan includes a directive for the controller to control the heating and/or cooling assembly to heat or cool the battery assembly using energy from an off-board or outside source of energy. The off-board or outside source of energy can be a source of energy that is not in the powered system, such as a wayside charging station, a catenary, an electrified rail, or the like. With respect to the powered system being a vehicle, the pre-conditioning plan can direct the controller to heat or cool the battery assembly using the off-board source of energy if the delay in movement of the vehicle is not too long. For example, the plan can direct the off-board source to power the heating and/or cooling assembly to heat or cool the battery assembly while the vehicle is stopped at a charging station so long as the temporal delay or time that the vehicle is stopped is shorter than a threshold delay. This threshold delay can be short enough to ensure that the vehicle does not miss one or more previously scheduled stops and/or does not arrive at a scheduled destination location later than a previously scheduled time.

Optionally, the plan can direct the off-board source to power the heating and/or cooling assembly to heat or cool the battery assembly while the vehicle is stopped at a charging station so long as the financial cost of the temporal delay or time that the vehicle is stopped is less than a threshold cost. Some vehicles may be delivering cargo or passengers on a contractual basis that includes financial penalties for delivering the cargo or passengers later than a contractually agreed upon time. If the financial penalty for delaying movement of the vehicle to power the heating and/or cooling assembly to heat or cool the battery assembly is less than the threshold cost, then the plan can direct the controller to allow the vehicle to stop and power the heating and/or cooling assembly from the wayside charging station. Otherwise, the plan may direct the controller to keep the vehicle moving and not stop to power the heating and/or cooling assembly from current from the wayside charging station.

The plan can direct the off-board source to power the heating and/or cooling assembly to heat or cool the battery assembly while the vehicle is moving as long as the off-board source is available to the vehicle for a range of distances. Catenaries, electrified rails, wireless charging stations, etc., can provide electric energy to the vehicle and the heating and/or cooling assembly while the vehicle is moving over a range of distances as the catenaries, electrified rails, wireless charging stations, and the like, extend over various lengths along the routes. Wayside charging stations that are at a location and do not extend over a length of a route are not available over a range of distances. If the off-board source is not available for a range of distances, then the plan may direct the controller to not control the vehicle to stop and obtain energy from the off-board source to power the heating and/or cooling assembly.

The pre-conditioning plan can prioritize usage of current or potential provided from a source other than the battery assembly. The pre-conditioning plan can direct the controller to direct current or potential (e.g., using one or more switches) to the heating and/or cooling assembly prior to the battery assembly. For example, the plan can direct the current from the propulsion system or off-board source to power the heating and/or cooling assembly to heat or cool the battery assembly first, and then charge the battery assembly.

The pre-conditioning plan may direct less than all of the battery assembly to be heated or cooled at different times and/or locations. The pre-conditioning plan can include instructions for a first string of battery cells in the battery assembly to be heated or cooled instead of a different, second string of battery cells in the same battery assembly. Different strings of the battery cells can be heated or cooled at different times according to the plan. For example, the plan can direct the heating and/or cooling assembly to cool a first string of battery cells in the battery assembly more than a second string of the battery cells in the battery assembly and for the second string of the battery cells to be used to power the vehicle prior to the first string of the battery cells. This can pre-condition the cooler first string of battery cells for a later warmup due to increasing ambient temperatures while the warmer second string of batteries is used first to power the load(s) and/or propulsion system. The selection of which cells are heated or cooled (more and/or prior to other cells) can be based on usage of the battery cells (e.g., which cells have been used more, which cells are older, which cells are going to be used before other cells to power loads, etc.), a chemistry of the battery cells, and/or locations of the battery cells within the battery assembly. For example, some cells may be located closer to an outlet or output of the heating and/or cooling assembly and may be more easily heated or cooled than other cells.

The pre-conditioning plan optionally can direct heating and/or cooling of the battery assembly by operation of the battery assembly. For example, the plan can direct the controller to control the battery assembly to discharge current using passive balancing among different cells or strings of the cells in the battery assembly. This passive balancing can increase the temperature of the battery assembly. The plan can direct use of passive balancing to heat the battery assembly before the predicted ambient temperature decreases and/or prior to a period of time where the duty cycle of the battery assembly is planned or expected to increase. Conversely, the plan can direct cessation of the passive balancing to avoid heating the battery assembly. Stopping usage of passive balancing can reduce the amount of heat generated by the battery assembly and can allow the battery assembly to cool prior to the predicted ambient temperature increasing and/or prior to a period of time where the duty cycle of the battery assembly is planned or expected to decrease.

The pre-conditioning plan can direct different times for the battery assembly to be heated or cooled based on the time needed to heat or cool the battery assembly to a designated or desired temperature. The plan can direct the heating or cooling of the battery assembly to begin sooner when the battery assembly needs to be heated or cooled more (e.g., due to more extreme predicted ambient temperatures) and to begin later when the battery assembly needs to be heated or cooled less (e.g., due to predicted ambient temperatures that are closer to the current temperature of the battery assembly). The time needed to heat or cool the battery assembly may be based on a default or measured rate at which the battery assembly can be heated or cooled due to chemistry of the cells in the battery assembly. Optionally, this rate can be based on the heating and/or cooling capability of the heating and/or cooling assembly. For example, some heating and/or cooling assemblies can heat or cool the battery assembly faster than other heating and/or cooling assemblies. The plan can direct the commencement of heating or cooling the battery assembly sooner for heating and/or cooling assemblies that more slowly heat or cool the battery assembly than other heating and/or cooling assemblies.

The pre-conditioning plan may include heating or cooling the battery assembly prior to activation of the powered system or the loads of the powered system. For example, in a cold environment, the plan may direct the battery assembly to be heated (e.g., using energy from a utility grid, such as by heating the battery assembly with an electric blanket) prior to activating the powered system to begin operation for the day.

In one embodiment, because the pre-conditioning plan is based at least in part on predicted ambient temperatures (with the plan also based on one or more other factors or information, such as the duty cycle of the battery assembly, available sources of energy for powering the heating and/or cooling assembly, etc.), the actual ambient temperatures may differ from the predicted ambient temperature. For example, a predicted rise or fall in the ambient temperature may not actually occur. To prevent or reduce wasteful or unnecessary heating or cooling of the battery assembly when the ambient temperature is not as warm or cool as the predicted ambient temperature, the predicted ambient temperature used by the plan may be established to prevent a "worst case" battery assembly temperature. This can involve the plan changing or determining the predicted ambient temperature to be a temperature that prevents the battery assembly from reaching a designated temperature associated with decreased performance of the battery assembly (e.g., the "worst case" predicted ambient temperature). For example, if the predicted ambient temperature includes a range of temperatures with a lower end of the range being a freezing temperature but the remaining range of temperatures being above the freezing temperature, the plan may determine that the predicted ambient temperature is a temperature within the range that will prevent the battery assembly from reaching the freezing temperature (even if some or a majority of the temperatures within the range of predicted ambient temperatures are above the freezing temperature).

Optionally, the plan may determine or modify a predicted ambient temperature from the range of possible or predicted ambient temperatures. For example, the plan may be created or modified (e.g., by the controller) to use (as the predicted ambient temperature for an upcoming location and/or time) an average or median of the temperatures within a range of predicted ambient temperatures.

Optionally, the plan may determine or modify a predicted ambient temperature from a difference between a current temperature of the battery assembly and a predicted ambient temperature. The plan may be created or modified (e.g., by the controller) to determine the predicted ambient temperature for an upcoming location and/or time to be an average, median, mid-point, etc. between a current battery assembly temperature and a previously predicted ambient temperature for that location and/or time. For example, the predicted ambient temperature that is forecasted by a weather service for an upcoming location at an upcoming time may be four degrees Celsius. The current battery assembly temperature may be twenty degrees Celsius. The plan may be created or modified to associate a predicted ambient temperature at the upcoming location and time to be twelve degrees Celsius (e.g., the mid-point between four and twenty degrees Celsius). This predicted ambient temperature can be used for determining whether and when to heat the battery assembly, as described herein.

The predicted ambient temperature can be based on a weighted calculation of predicted temperatures. For example, a predicted weather condition (such as temperature) can be based on different inputs or factors, can be different from different sources (e.g., different sensors and/or weather forecasting services), etc. The predicted ambient temperature for an upcoming location at an upcoming time can be calculated as an average of the different temperatures from the different inputs (e.g., different sensors, different weather services, previously measured temperatures at the same time of day and/or same time of year, etc.). The temperatures from the different inputs may be associated with different weights (e.g., coefficients). For example, a predicted temperature from a weather service or station may be given more weight than a previously measured temperature, but less weight than a currently measured temperature at the upcoming location. The predicted ambient temperature for that location can be calculated by summing a first product (of the weather service-predicted temperature and a first coefficient) with a second product (of the previously measured temperature and a second coefficient) with a third product (of the currently measured temperature and a third coefficient), and then dividing this sum of the three products by three. The first coefficient may have the largest value (e.g., the greatest weight), the second coefficient may the smallest value (e.g., the smallest weight), and the third coefficient may have a value between the first and second coefficients.

At step 208, the temperature of the battery assembly is changed according to the pre-conditioning plan. For example, the battery assembly may be heated and/or cooled by the heating and/or cooling assembly according to the plan. The plan may direct the battery assembly to be heated or cooled to maintain the temperature of the battery assembly within a designated or desired temperature range during operation or movement of the powered system. Optionally, the plan may direct the battery assembly to be heated or cooled to reduce excursions of the temperature of the battery assembly within a designated or desired temperature range during operation or movement of the powered system.

In one embodiment, the temperature of the battery assembly can be determined and compared with the temperatures of the pre-conditioning plan to determine whether to heat or cool the battery assembly to thereby ensure that the temperature of the battery assembly follows the plan or remains within the designated range of acceptable temperatures. The temperature of the battery assembly can be measured by one or more temperature sensors. Optionally, the temperature of the battery assembly can be determined by calculating or identifying an average, median, maximum, or minimum of several measured temperatures of the battery assembly. As another example, the temperature of the battery assembly can be estimated based off other measurements. For example, the temperature of a housing of the battery assembly, connector to the battery assembly, coolant flowing by or through the battery assembly, or the like, may be determined. The battery assembly can be estimated based off the measurement. For example, the battery assembly can be estimated to be a designated number of degrees warmer than the measured temperature. As another example, the resistance or current conducted into or out of the battery assembly, conducted through a joint or connector to the battery assembly, or the like, can be measured and used to estimate the battery assembly temperature. The temperature may be estimated to be warmer for greater resistances or amounts of current and may be estimated to be cooler to lesser resistances or amounts of current.

At step 210, the battery assembly powers one or more loads of the powered system. The heating and/or cooling assembly may heat or cool the battery assembly according to the temperature pre-conditioning plan before and/or during operation (e.g., movement or stationary operation of the powered system) to increase the performance and useful life of the battery assembly.

Optionally, the method can include modifying or re-planning the temperature pre-conditioning plan. One or more factors used to create the plan may change after the plan was created. For example, a duty cycle of the battery assembly may change, predicted ambient temperatures may change, costs of using one or more sources of energy may change, etc. The method can include modifying the plan to account for one or more of these changes after the plan is created.

The plan can be modified and/or overridden by an operator of the powered system. The operator of the powered system may provide input to the input and/or output device to change which power source is used to power the heating and/or cooling assembly to heat or cool the battery assembly. For example, the plan may direct the propulsion system to provide current to the heating and/or cooling system to heat or cool the battery assembly, but the operator may provide input that causes the battery assembly to power the heating and/or cooling assembly to heat or cool the battery assembly. The controller can present information to the operator of the cost of making this override decision, such as how much less energy will be available from the battery assembly for powering the propulsion system and/or other loads, if the battery assembly is used to power the heating and/or cooling assembly. The input and/or output device can display or audibly present information informing the operator of which power source is currently being used and/or will be used to power the heating and/or cooling assembly for heating or cooling the battery assembly. This information can assist the operator in deciding whether to override the plan or to allow the plan-identified source of energy for powering the heating and/or cooling system to be used.

Figure 4:
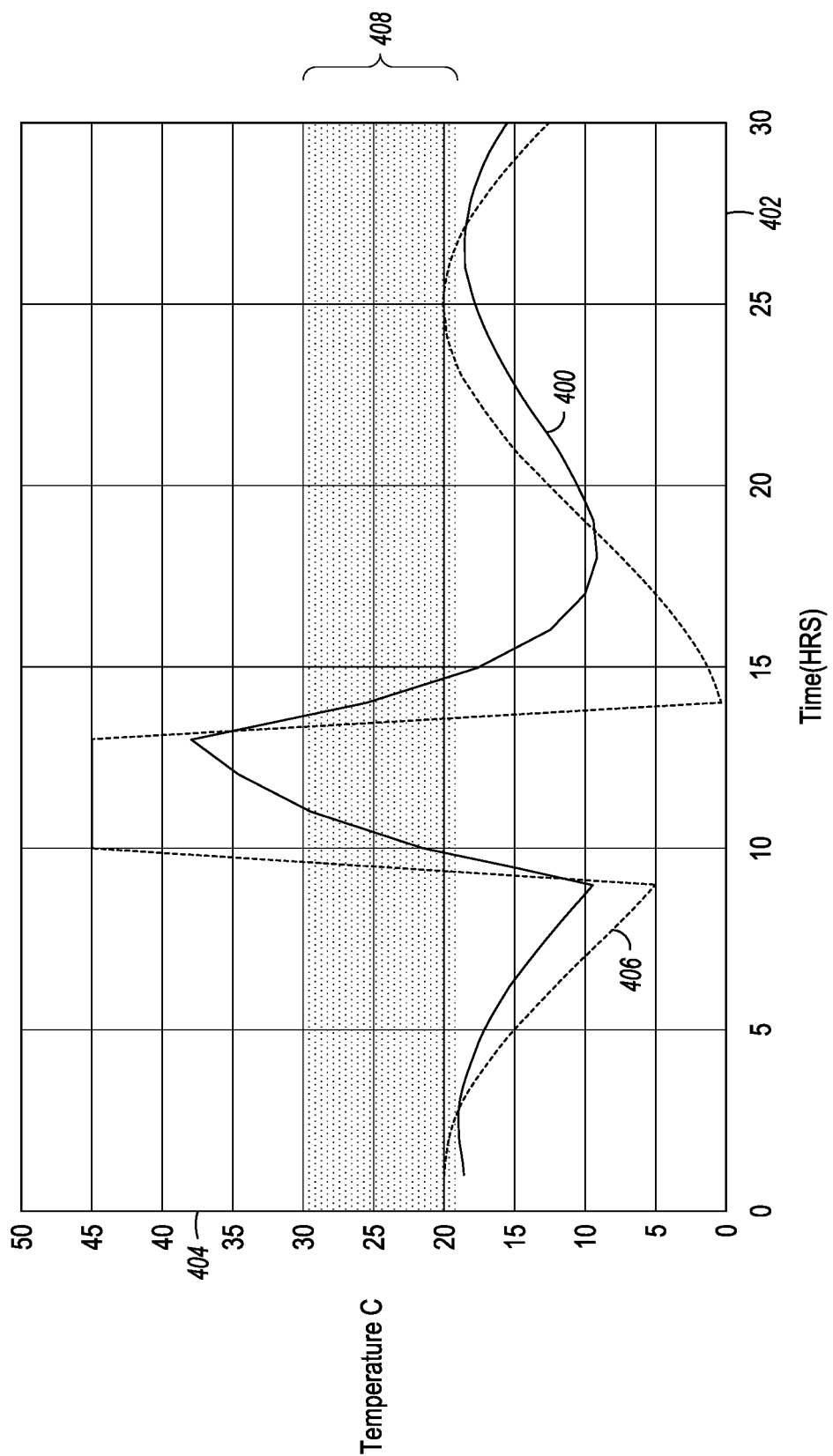
FIG. 4 illustrates one example of temperatures of the battery assembly without heating or cooling the battery assembly according to a temperature pre-conditioning plan.

FIG. 4 illustrates one example of temperatures 400 of the battery assembly without heating or cooling the battery assembly according to a temperature pre-conditioning plan. The temperatures of the battery assembly are shown alongside a horizontal axis 402 representative of time and a vertical axis 404 representative of temperature. Optionally, the horizontal axis may represent different locations during a trip of the powered system. Also shown in FIG. 4 are ambient temperatures 406 associated with the different times or locations. These ambient temperatures can be the predicted ambient temperatures described above. A desired or designated temperature range 408 is shown in FIG. 4. This temperature range can represents the desired operating temperatures of the battery assembly that will improve operation of the battery assembly (e.g., faster charging rate, increased energy storage, etc.) and/or increase the useful life of the battery assembly.

The ambient temperatures start very cool and continue to cool until around hour eight or nine. During this time period, the battery temperature also decreases and falls below the lower end of the desired temperature range. As a result, the useful life and/or operation of the battery assembly may be decreased relative to the temperature of the battery assembly remaining within the desired temperature range. The ambient temperature may then rapidly increase and remain elevated over the time period from hour nine to hour thirteen. This increase in heat also can increase the temperature of the battery assembly up into, through, and above the desired temperature range, as shown in FIG. 4. The ambient temperature then decreases again, causing the temperature of the battery assembly to drop into and below the desired temperature range.

As shown, the temperature of the battery assembly is outside of the desired temperature range for a large portion of percentage of the time period shown in FIG. 4. The ambient temperature changes cause the battery assembly to be outside of the desired temperature range, which can decrease performance and the useful life of the battery assembly.

Figure 5:
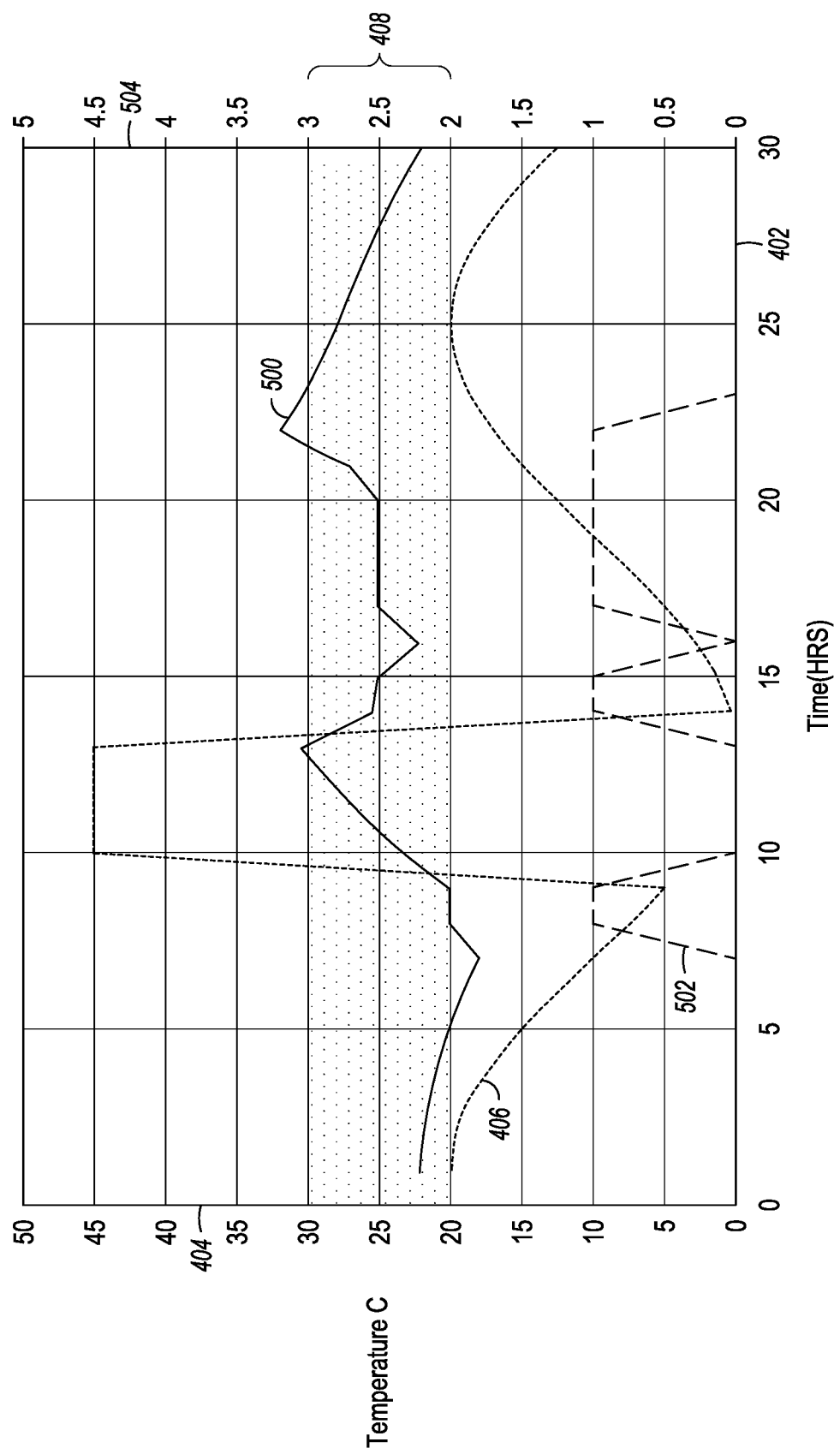
FIG. 5 illustrates another example of temperatures of the battery assembly with heating or cooling the battery assembly according to a temperature pre-conditioning plan.

In contrast, pre-heating and/or pre-cooling the battery assembly based on the duty cycle and/or the predicted ambient temperatures can increase the time period over which the temperature of the battery assembly remains within the desired temperature range. FIG. 5 illustrates another example of temperatures 500 of the battery assembly with heating or cooling the battery assembly according to a temperature pre-conditioning plan. The temperatures of the battery assembly are shown alongside the horizontal axis 402 representative of time and the vertical axis 404 representative of temperature. Optionally, the horizontal axis may represent different locations during a trip of the powered system. Also shown in FIG. 5 are the ambient temperatures 406 and the desired or designated temperature range 408. Availabilities 502 of sources of electric energy for powering the heating and/or cooling assembly to heat and/or cool the battery assembly according to the temperature pre-conditioning plan are shown as well. These availabilities indicate time periods and/or locations where the propulsion system, wayside charger, catenary, electrified rail, etc. is available for powering the heating and/or cooling assembly to heat or cool the battery assembly (so that the battery assembly need not power the heating and/or cooling assembly). Values of the availabilities 502 at 1.0 along a second vertical axis 504 represent time periods that the other sources of energy (e.g., other than the battery assembly) are available to power the heating and/or cooling assembly. Values of the availabilities 502 at 0.0 along the second vertical axis 504 represent time periods that the other sources of energy are not available to power the heating and/or cooling assembly.

The pre-conditioning plan may cause the controller to direct the heating and/or cooling assembly to begin heating the battery assembly at five hours along the horizontal axis. As shown, this can prevent the temperature of the battery assembly from dropping below the lower end of the designated temperature range as far as the temperature of the battery assembly would have dropped without this heating of the battery assembly. For example, from a time of five hours to a time of eight hours, the temperature of the battery assembly without pre-conditioning (FIG. 4) decreases below the designated temperature range much farther than the temperature of the battery assembly with pre-conditioning (FIG. 5). At a time of eight hours, the controller may direct another source of energy to heat the battery assembly. For example, between five and eight hours, the controller can direct the battery assembly to power the heating and/or cooling assembly to heat the battery assembly. At the eight hour time along the horizontal axis, however, the pre-conditioning plan can direct the controller to control a source of energy other than the battery assembly to power the heating and/or cooling assembly to heat the battery assembly. This can reduce the amount of energy discharged from the battery assembly relative to having the battery assembly alone power the heating and/or cooling assembly. Optionally, the pre-conditioning plan and the controller can direct both the other source of energy and the battery assembly to power the heating and/or cooling assembly during the time from five hours to eight hours.

The pre-conditioning plan can direct the battery assembly to be heated during this time period due to the expected decrease in ambient temperatures until the ninth hour along the horizontal axis. This can reduce how far the temperature of the battery assembly drops below the designated temperature range and/or how long the temperature of the battery assembly is below the designated temperature range up to the tenth hour along the horizontal axis.

After the ninth hour, the pre-conditioning plan can direct the battery assembly to be cooled as and/or prior to the predicted or expected ambient temperature increasing at the ninth hour. This can prevent the temperature of the battery assembly from increasing above the upper limit of the designated temperature range, can reduce how much warmer the battery assembly becomes above the designated temperature range, and/or can limit how long the battery assembly is warmer than the designated temperature range. The pre-conditioning plan also can cause the controller to direct the heating and/or cooling assembly to heat the battery assembly prior to the predicted ambient temperature decreasing at or after the twenty-fifth hour along the horizontal axis.

As shown by a comparison of the temperatures of the battery assembly in FIGS. 4 and 5, heating and/or cooling the battery assembly according to the pre-conditioning plan can reduce the number and/or amount (e.g., magnitude) of excursions of the temperatures from the desired temperature range. The battery assembly temperatures that are achieved using the pre-conditioning plan remain within this range for longer, the increases in the battery assembly temperatures above the designated range are smaller, the increases in the battery assembly temperatures above the designated range last for shorter periods of time, the decreases in the battery assembly temperatures below the designated range are smaller, and the decreases in the battery assembly temperatures below the designated range last for shorter periods of time when compared with the battery assembly temperatures without the pre-conditioning plan.

The designated temperature range can be a fixed temperature range or can be determined (e.g., calculated) by the controller. In one example, the designated temperature range can be determined based on a cell chemistry of the battery assembly. Different cell chemistries (e.g., contents of the battery cells, such as the materials used for the electrolyte, anode, and cathode) can be associated (e.g., in a memory) with different temperature ranges. The temperature range that is used for the pre-conditioning plan can be selected based on which cell chemistry that the battery assembly includes. As another example, the temperature range can be a default or operator-input range.

The designated temperature range can be based on an age of the battery assembly and/or prior usage of the battery assembly. For example, as the battery assembly ages or is used more often (e.g., has a greater number of duty cycles), the temperature range can decrease in size. Newer battery assemblies and/or battery assemblies that are used less often (e.g., to power loads) can have wider temperature ranges that include more temperatures. The designated temperature range can vary based on a health of the battery assembly. Battery assemblies that are not able to store as much energy as before can have narrower temperature ranges used for the pre-conditioning plan than battery assemblies that can still store as much energy as before. Battery assemblies that are unable to store as much energy can be restricted from operation but continue to be temperature conditioned (as described herein) according to the pre-conditioning plan until the battery assemblies are able to be examined, repaired, or otherwise serviced.

The designated temperature range can change at different times and/or locations. For example, the designated temperature range can be narrower during initial or early usage of the battery assembly and then become larger as usage of the battery assembly continues (e.g., during the same day). As another example, the designated temperature range can change as the amount of energy stored in the battery assembly changes. As the amount of stored energy (or state of charge) of the battery assembly decreases, the designated temperature range can increase in size. This can result in the energy used by the battery assembly to heat or cool the battery assembly to be reduced as a wider range of temperatures for the battery assembly is acceptable. This can help prevent discharge of energy from the battery assembly to heat or cool the battery assembly when this energy may be needed for other purposes (e.g., propelling the powered system).

In one embodiment, the battery monitoring system may have a local data collection system deployed that may use machine learning to enable derivation-based learning outcomes. The controller of the battery monitoring system may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the battery monitoring system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action.

This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

In one embodiment, a method includes determining a predicted ambient temperature at one or more of (a) an upcoming time and/or (b) an upcoming location that a vehicle is to travel to or through. The vehicle has one or more loads that are at least partially powered by a battery assembly onboard the vehicle. The method also includes determining a duty cycle of the battery assembly for the vehicle at the one or more of the upcoming time or the upcoming location, and determining a temperature pre-conditioning plan for the battery assembly based on the predicted ambient temperature and based on the duty cycle of the battery assembly. The temperature pre-conditioning plan includes one or more of conditioning times during which the battery assembly is heated or cooled ahead of the one or more of the upcoming time or the upcoming location, conditioning locations where the battery assembly is heated or cooled ahead of the one or more upcoming locations, an amount of electric energy stored in the battery assembly that is used to heat or cool the battery assembly and not available for powering the one or more loads, a first availability of an off-board charging source for charging the battery assembly, and/or a second availability of an onboard source to provide power to charge the battery assembly.

The duty cycle of the battery assembly can be determined to reduce an amount of energy stored in the battery assembly that is used to heat or cool the battery assembly to reduce excursions of a first temperature of the battery assembly from a desired temperature range relative to the vehicle traveling to or through the one or more upcoming locations with a different duty cycle of the battery assembly. The method also can include determining the desired temperature range based on one or more of a cell chemistry of the battery assembly, an age of the battery assembly, a number of prior duty cycles of the battery assembly, a health state of the battery assembly, and/or an amount of energy storage available at a given time. The method also can include maintaining a first temperature of the battery assembly within a desired temperature range during travel to or through the one or more upcoming locations.

The temperature pre-conditioning plan can be determined to maintain a first temperature of the battery assembly within a desired temperature range during stationary operation of the powered system. The temperature pre-conditioning plan can be a continuous pre-conditioning plan. The method also can include precooling the battery assembly before the vehicle reaches the one or more upcoming locations having elevated temperatures relative to one or more of a second temperature of a current location of the vehicle and/or a designated battery temperature.

The method can include preheating the battery assembly before one or more of (1) the vehicle reaches the one or more upcoming locations having reduced temperatures relative to a second temperature of a current location of the vehicle and/or (2) a first temperature of the battery assembly drops below the designated battery temperature. The method can include preheating the battery assembly before the duty cycle of the battery assembly is reduced. The method can include using energy stored in the battery assembly to heat or cool the battery assembly to maintain a first temperature of the battery assembly within a desired temperature range. The predicted ambient temperature can be based on one or more of a weather forecast during a time that the vehicle will be at the one or more upcoming locations, a time of day that the vehicle will be at the one or more upcoming locations, a season of a calendar year during which the vehicle will be at the one or more upcoming locations, a geographic location of the one or more upcoming locations, and/or a prior temperature profile of one or more prior dates.

The predicted ambient temperature can be based on an altitude of the one or more upcoming locations, a determination that the one or more upcoming locations are within an urban area or a rural area, and/or a determination that the one or more upcoming locations are within an airflow restricted area. The predicted ambient temperature can be based on one or more prior travels of the vehicle or another vehicle to or through the one or more upcoming locations or nearby locations that are within a threshold distance of planned travel of the vehicle. The predicted ambient temperature can be obtained from one or more wayside sensors disposed at the one or more upcoming locations or a vehicle sensor disposed onboard another vehicle traveling ahead of the vehicle with the battery assembly, or a weather station.

The method can include using energy obtained from an off-board source while the vehicle is moving. For example, electric current can be obtained from a catenary, electrified rail, or the like, to power one or more loads of the vehicle, to power the heating and/or cooling assembly, to charge the battery assembly, or the like, while the vehicle continues to move. The method also can include using energy obtained from a charging station before reaching the one or more upcoming locations responsive to a temporal travel delay associated with heating or cooling the battery assembly using the energy obtained from the charging station being less than a threshold delay. For example, the method can include stopping the vehicle at a charging station to power the heating and/or cooling assembly (to heat or cool the battery assembly) so long as the time needed to heat or cool the battery assembly to a designated temperature using the stationary charging station (while the vehicle is stationary) is no longer than a designated time period. This can help ensure that the vehicle does not fall behind schedule while maintaining the temperature of the battery assembly within acceptable limits.

The temporal travel delay can be determined to be less than the threshold delay responsive to the charging station being a charging station that is available for charging over a range of distances. For example, if the charging station is mobile, is a catenary, is an electrified rail, or the like, then the delay can be less than if the vehicle were required to stop to obtain energy from the station (because the vehicle can continue to move while obtaining energy from the station). The method also can include selecting a charging station as the energy source for the thermal management based at least in part on a financial cost of obtaining the energy from the charging station is acceptable or below a threshold cost. The charging station can be one or more of an electrified rail, an electrified catenary, or a wireless charging system.

The method also can include using energy obtained from a charging station to thermally condition the battery assembly preferentially or prior to the charging station charging the battery assembly. The method also can include using energy obtained from operation of an engine onboard the vehicle to thermally manage the battery assembly. The method also can include using heat generated by an engine or a fuel cell that is onboard the vehicle to heat the battery assembly. The method can include using a cooling circuit onboard the vehicle to cool the battery assembly. The temperature pre-conditioning plan can direct the battery assembly to be cooled using the vehicle as a thermal mass that absorbs heat from the battery assembly. The temperature pre-conditioning plan can direct the battery assembly to be heated using passive balancing. The energy that is stored in cells of the assembly having greater charge can be dissipated as heat via passive balancing, and this heat can be used to heat the battery assembly so that the temperature of the battery assembly remains within the range of acceptable temperatures. The temperature pre-conditioning plan directs cessation of passive balancing to avoid heating the battery assembly. The temperature pre-conditioning plan can direct a first string of battery cells in the battery assembly to be cooled more than a second string of the battery cells in the battery assembly and for the second string of the battery cells to be used to power the vehicle prior to the first string of the battery cells.

The temperature pre-conditioning plan can direct one or more first strings of battery cells in the battery assembly to be used for powering heating or cooling the battery assembly while one or more second strings of the battery cells are not to be used for powering heating or cooling of the battery assembly. The temperature pre-conditioning plan can direct one or more first strings of battery cells in the battery assembly to be heated or cooled while one or more second strings of the battery cells in the battery assembly are not heated or cooled based on one or more of usage of the battery cells, a chemistry of the battery cells, and/or locations of the battery cells. The one or more loads can include a propulsion system that is powered by the battery assembly to propel the vehicle. The one or more loads can include an auxiliary load that is powered by the battery assembly to perform work other than propulsion of the vehicle. The duty cycle and the temperature pre-conditioning plan can be determined for the battery assembly for movement of the vehicle. The duty cycle and the temperature pre-conditioning plan can be determined for the battery assembly for while the vehicle is stationary.

In one embodiment, a system includes one or more processors that may determine a predicted ambient temperature at one or more upcoming locations that a vehicle is to travel to or through. The vehicle has a propulsion system that is at least partially powered by a battery assembly onboard the vehicle. The one or more processors may determine a duty cycle of the battery assembly for upcoming travel of the vehicle to or through the one or more upcoming locations, and may determine a temperature pre-conditioning plan for the battery assembly based on the predicted ambient temperature and based on the duty cycle of the battery assembly. The temperature pre-conditioning plan includes one or more of (a) conditioning times during which the battery assembly is heated or cooled ahead of the one or more upcoming locations and/or (b) conditioning locations where the battery assembly is heated or cooled ahead of the one or more upcoming locations.

The one or more processors may determine the duty cycle of the battery assembly to reduce an amount of energy stored in the battery assembly that is used to heat or cool the battery assembly to reduce excursions of a measured temperature of the battery assembly from a desired temperature range relative to the vehicle traveling to or through the one or more upcoming locations with a different duty cycle of the battery assembly. The one or more processors may determine the temperature pre-conditioning plan to maintain a measured temperature of the battery assembly within a desired temperature range during travel to or through the one or more upcoming locations. The one or more processors may determine the desired temperature range based on one or more of a cell chemistry of the battery assembly, an age of the battery assembly, or a number of prior duty cycles of the battery assembly. The one or more processors may determine the temperature pre-conditioning plan to include precooling the battery assembly before the vehicle reaches the one or more upcoming locations having elevated temperatures relative to a temperature of a current location of the vehicle.

The one or more processors may determine the temperature pre-conditioning plan to include preheating the battery assembly before the vehicle reaches the one or more upcoming locations having reduced temperatures relative to a temperature of a current location of the vehicle. The one or more processors may determine the temperature pre-conditioning plan to include preheating the battery assembly before the duty cycle of the battery assembly is reduced. The one or more processors may determine the temperature pre-conditioning plan to reduce an amount of energy stored in the battery assembly that is used to heat or cool the battery assembly to reduce excursions of a measured temperature of the battery assembly from a desired temperature range relative to the vehicle traveling to or through the one or more upcoming locations without heating or cooling the battery assembly.

The one or more processors may determine the predicted ambient temperature based on one or more of a weather forecast during a time that the vehicle will be at the one or more upcoming locations, a time of day that the vehicle will be at the one or more upcoming locations, a season of a calendar year during which the vehicle will be at the one or more upcoming locations, or a geographic location of the one or more upcoming locations. The one or more processors may determine the predicted ambient temperature based on an altitude of the one or more upcoming locations, a determination that the one or more upcoming locations are within an urban area or a rural area, or a determination that the one or more upcoming locations are within an airflow restricted area.

The one or more processors may determine the predicted ambient temperature based on one or more prior travels of the vehicle or another vehicle to or through the one or more upcoming locations. The one or more processors may determine the predicted ambient temperature from one or more wayside sensors disposed at the one or more upcoming locations or a vehicle sensor disposed onboard another vehicle traveling ahead of the vehicle with the battery assembly, or a weather station. The one or more processors may determine the temperature pre-conditioning plan to direct the battery assembly to be heated or cooled using energy obtained from a wayside charging station that the vehicle stops at before reaching the one or more upcoming locations.

The one or more processors may determine the temperature pre-conditioning plan to direct the battery assembly to be heated or cooled using the energy obtained from the wayside charging station prior to the wayside charging station charging the battery assembly. The one or more processors may determine the temperature pre-conditioning plan to direct the battery assembly to be heated or cooled using energy obtained from operation of an engine onboard the vehicle. The one or more processors may determine the temperature pre-conditioning plan to direct the battery assembly to be heated using heat generated by the engine onboard the vehicle.

The one or more processors may determine the temperature pre-conditioning plan to direct the battery assembly to be cooled using a cooling circuit of the engine onboard the vehicle. The one or more processors may determine the temperature pre-conditioning plan to direct the battery assembly to be cooled using the vehicle as a thermal mass that absorbs heat from the battery assembly. The one or more processors may determine the temperature pre-conditioning plan to direct the battery assembly to be heated using passive balancing. The one or more processors may determine the temperature pre-conditioning plan to direct cessation of passive balancing to avoid heating the battery assembly.

The one or more processors may determine the temperature pre-conditioning plan to direct a first string of battery cells in the battery assembly to be cooled more than a second string of the battery cells in the battery assembly and for the second string of the battery cells to be used to power the vehicle prior to the first string of the battery cells.

In one embodiment, a method includes determining an upcoming predicted ambient temperature for a vehicle having a propulsion system that is at least partially powered by a battery assembly onboard the vehicle, and determining a temperature pre-conditioning plan for the battery assembly based on the predicted ambient temperature. The temperature pre-conditioning plan directs heating and/or cooling of the battery assembly to reduce excursions of a measured temperature of the battery assembly outside of a desired temperature range compared to the battery assembly not being heated or cooled.

The temperature pre-conditioning plan can be determined based on costs associated with heating or cooling the battery assembly using different power sources. The temperature pre-conditioning plan can be determined based on which power sources are available for supplying electric energy for heating or cooling the battery assembly. The temperature pre-conditioning plan can be determined based on an amount of time needed to heat or cool the battery assembly. The temperature pre-conditioning plan can be modified after beginning heating or cooling of the battery assembly according to the temperature pre-conditioning plan.

The method also can include modifying or overriding the temperature pre-conditioning plan based on operator input.

In one embodiment, a method includes thermally conditioning a battery assembly prior to a determined upcoming time or the battery assembly's arrival at an upcoming location, and selecting a source of the power used for the thermal conditioning. In one embodiment, a system includes a controller having one or more processors that may thermally condition a temperature of a battery assembly. The controller also may select a source of the power used to condition the battery assembly temperature, a time for the thermal conditioning to occur, or both the source of the power and the time for the thermal conditioning.

The thermal conditioning can be based at least in part on both 1) a predicted or measured ambient temperature at a determined location, and 2) on an actual or expected duty cycle of the battery assembly prior to its arrival at the determined location or while in the determined location. In one embodiment, the system mass and environment are considered to determine a heat soak value. A low-mass system made of aluminum may attain the pre-determined pre-condition temperature faster but may not hold it for as long relative to a high-mass system made of, for example, steel or plastic, that retains heat longer than thermally transmissive materials.

Thermal excursions of the battery system outside of the determined operating range (likely the optimized operating range) may be monitored and recorded in one embodiment. The frequency, duration and severity of the deviation may be monitored and recorded (independently or together). Such a stress event catalog of the battery (or its components—strings, modules, cells) may be used to control vehicle performance, maintenance schedule, and/or form a health status of the battery system.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   determining a conditioning time or a conditioning location to thermally condition a battery assembly prior to (a) a determined upcoming time in which the battery assembly will discharge energy to power one or more loads or (b) arrival of the battery assembly at an upcoming location at which the battery assembly will discharge energy to power the one or more loads;
   selecting a first source of power to be used for thermal conditioning the battery assembly at the conditioning time or the conditioning location, the first source of power selected from among multiple different sources of power based at least in part on respective availabilities of the different sources of power for changing a temperature of the battery assembly at the conditioning time or the conditioning location; and thermally conditioning the battery assembly at the conditioning time or the conditioning location using power from the first source of power.

2. A system comprising:

a controller configured to control a heating and/or cooling assembly onboard a vehicle to thermally condition a battery assembly onboard the vehicle, the controller configured to determine a conditioning time at which the heating and/or cooling assembly thermally conditions the battery assembly prior to the vehicle reaching an upcoming location that the vehicle is to travel to or through, the controller configured to determine the conditioning time based at least in part on both 1) a predicted or measured ambient temperature at the upcoming location and 2) an actual or expected duty cycle of the battery assembly while the vehicle is at the upcoming location, and, the controller is configured to determine respective availabilities over time of multiple different sources of power to power the heating and/or cooling assembly, the controller configured to select a first source of power from the multiple different sources of power to power the heating and/or cooling assembly to thermally condition the battery assembly at the conditioning time based at least in part on the availability of the first source of power indicating that the first source of power is available to change the temperature of the battery assembly at the conditioning time.

3. A method comprising:

determining predicted ambient temperatures at one or more of (a) upcoming times or (b) upcoming locations that a vehicle is to travel to or through, the vehicle having one or more loads that are at least partially powered by a battery assembly onboard the vehicle;

determining a duty cycle of the battery assembly for the vehicle at each of the one or more of the upcoming times or the upcoming locations;

determining respective availabilities over time of multiple different sources of power to power a heating and/or cooling assembly onboard the vehicle to thermally condition the battery assembly; and determining a temperature pre-conditioning plan for the battery assembly based on the predicted ambient temperature, the duty cycle of the battery assembly, and the respective availabilities of the different sources of power, the temperature pre-conditioning plan including one or more of:

first and second conditioning times during which the battery assembly is heated or cooled ahead of the one or more of the upcoming times or the upcoming locations, or first and second conditioning locations where the battery assembly is heated or cooled ahead of the one or more upcoming times or the upcoming locations, and wherein the temperature pre-conditioning plan dictates, based on the respective availabilities of the multiple different sources of power to change the temperature of the battery assembly, that an off-board charging source of the multiple different sources of power is selected to power the heating and/or cooling assembly to change the temperature of the battery assembly at one or more of the first conditioning time or the first conditioning location, and an onboard source of the multiple different sources of power is selected to power the heating and/or cooling assembly to change the temperature of the battery assembly at one or more of the second conditioning time or the second conditioning location.

4. The method of claim 3, wherein the temperature pre-conditioning plan includes precooling the battery assembly before the vehicle reaches a first upcoming location of the upcoming locations that has an elevated first ambient temperature relative to a second ambient temperature of a current location of the vehicle, and the temperature pre-conditioning plan includes preheating the battery assembly before the vehicle reaches a second upcoming location of the upcoming locations that has a reduced third ambient temperature relative to the second ambient temperature of the current location of the vehicle.

5. The method of claim 3, wherein the off-board charging source is a charging station and the charging station is included in the temperature pre-conditioning plan responsive to one or more of (i) determining that a temporal travel delay associated with heating or cooling the battery assembly using energy obtained from the charging station is less than a threshold delay (ii) determining that a financial cost of obtaining the energy from the charging station is below a threshold cost.

6. The method of claim 3, wherein the off-board charging source is a charging station and the temperature pre-conditioning plan dictates that energy from the charging station is directed to the heating and/or cooling assembly to thermally condition the battery assembly prior to the charging station charging the battery assembly.

7. The method of claim 3, wherein the onboard source is one or more of an engine or a fuel cell that is used to heat the battery assembly.

8. The method of claim 3, wherein the temperature pre-conditioning plan directs cessation of passive balancing among different strings of battery cells in the battery assembly to avoid heating the battery assembly.

9. The method of claim 3, further comprising selecting a charging station as a first source of power to change the temperature of the battery assembly based at least in part on a financial cost of obtaining power from the charging station equal to or below a threshold cost.

10. The method of claim 3, further comprising using energy obtained from a charging station to thermally condition the battery assembly preferentially or prior to the charging station charging the battery assembly.

11. The method of claim 3, further comprising using energy obtained from operation of an engine onboard the vehicle to thermally manage the battery assembly.

12. The method of claim 11, further comprising using heat generated by an engine or a fuel cell that is onboard the vehicle to heat the battery assembly.

13. The method of claim 11, further comprising using a cooling circuit onboard the vehicle to cool the battery assembly.

14. The method of claim 3, wherein the temperature pre-conditioning plan directs cessation of passive balancing to avoid heating the battery assembly.

15. The method of claim 3, wherein the temperature pre-conditioning plan directs a first string of battery cells in the battery assembly to be cooled more than a second string of the battery cells in the battery assembly and for the second string of the battery cells to be used to power the vehicle prior to the first string of the battery cells.

16. The method of claim 3, wherein the temperature pre-conditioning plan directs one or more first strings of battery cells in the battery assembly to be used for powering heating or cooling the battery assembly while one or more second strings of the battery cells are not to be used for powering heating or cooling of the battery assembly.

17. The method of claim 3, wherein the temperature pre-conditioning plan directs one or more first strings of battery cells in the battery assembly to be heated or cooled while one or more second strings of the battery cells in the battery assembly are not heated or cooled based on one or more of usage of the battery cells, a chemistry of the battery cells, or locations of the battery cells.

18. The method of claim 3, wherein the one or more loads include a propulsion system that is powered by the battery assembly to propel the vehicle.

19. The method of claim 3, wherein the one or more loads include an auxiliary load that is powered by the battery assembly to perform work other than propulsion of the vehicle.

20. The method of claim 3, wherein the duty cycle and the temperature pre-conditioning plan are determined for the battery assembly for movement of the vehicle.

\* \* \* \* \*